(12) United States Patent
Apostolo et al.

(10) Patent No.: US 6,642,331 B2
(45) Date of Patent: Nov. 4, 2003

(54) PERFLUOROELASTOMERS

(75) Inventors: Marco Apostolo, Novara (IT); Stefano Arrigoni, Novara (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/270,633

(22) Filed: Oct. 16, 2002

(65) Prior Publication Data

US 2003/0119993 A1 Jun. 26, 2003

(30) Foreign Application Priority Data

Oct. 18, 2001 (IT) .................................... MI2001A2165

(51) Int. Cl.⁷ ............................................. C08F 214/26
(52) U.S. Cl. ....................... 526/247; 526/206; 526/242; 525/326.3; 525/366; 525/368; 525/369; 525/370; 525/371; 525/372
(58) Field of Search ................................ 526/206, 247, 526/242; 525/326.3, 366, 368, 369, 370, 371, 372

(56) References Cited

U.S. PATENT DOCUMENTS

| | | |
|---|---|---|
| 3,132,123 A | 5/1964 | Harris, Jr. et al. |
| 3,450,684 A | 6/1969 | Darby et al. |
| 3,810,874 A | 5/1974 | Mitsch et al. |
| 3,817,960 A | 6/1974 | Resnick |
| 4,035,565 A | 7/1977 | Apotheker et al. |
| 4,243,770 A | 1/1981 | Tatemoto et al. |
| 4,487,903 A | 12/1984 | Tatemoto et al. |
| 4,564,662 A | 1/1986 | Albin |
| 4,694,045 A | 9/1987 | Moore |
| 4,745,165 A | 5/1988 | Arcella et al. |
| 4,766,190 A | 8/1988 | Morita et al. |
| 4,789,717 A | 12/1988 | Giannetti et al. |
| 4,864,006 A | 9/1989 | Giannetti et al. |
| 4,943,622 A | 7/1990 | Naraki et al. |
| 4,990,283 A | 2/1991 | Visca et al. |
| 5,173,553 A | 12/1992 | Albano et al. |
| 5,268,405 A | 12/1993 | Ojakaar et al. |
| 5,401,818 A | 3/1995 | Oka et al. |
| 5,710,345 A * | 1/1998 | Navarrini et al. ........... 568/596 |
| 6,310,142 B1 * | 10/2001 | Apostolo et al. ........... 525/200 |

FOREIGN PATENT DOCUMENTS

| | | |
|---|---|---|
| EP | 0 130 052 A1 | 1/1985 |
| EP | 0 136 596 A2 | 4/1985 |
| EP | 0 199 138 A2 | 10/1986 |
| EP | 0 410 351 A1 | 1/1991 |
| EP | 0 708 797 B1 | 5/1996 |
| EP | 1 148 072 A2 | 10/2001 |

OTHER PUBLICATIONS

Maskornik M. et al. "ECD–006 Fluoroelastomer—A high performance engineering material", Soc. Plast. Eng. Tech. Pao. (1974), 20, 675–7.
J. Macromol. Sci. Phys., B1(14), 815–830, Dec. 1967.
Kununyants et al., Izv. Akad. Nauk. SSR, Serv. Khim. 1964 (2), 384–6.
Kununyants et al., Izv. Akad. Nauk. SSR, Serv. Khim. 1964. (2), 384–6.

* cited by examiner

*Primary Examiner*—Fred Teskin
(74) *Attorney, Agent, or Firm*—Arent Fox Kintner Plotkin & Kahn

(57) ABSTRACT

Perfluoroelastomers, curable by peroxidic route, obtainable by polymerizing the following monomers:

a) tetrafluoroethylene (TFE);
b) fluorovinylethers of general formula:

$$CFX=CXOCF_2OR \qquad (I)$$

c) bis-olefins having general formula:

$$R'_1R'_2C=CR'_3-Z-CR'_4=CR'_5R'_6 \qquad (IA)$$

d) optionally, one or more fluorinated olefinic comonomers selected from $C_2-C_8$ perfluoroolefins, perfluoroalkylvinylethers (PAVE) $CF_2=CFOR^2_f$, perfluorooxyalkylvinylethers $CF_2=CFOX^a$, said perfluoroelastomers comprising iodine and/or bromine atoms in the chain and/or in end position, said halogen atoms deriving from "cure site" comonomers and/or from chain transfer agents used in polymerization.

19 Claims, No Drawings

PERFLUOROELASTOMERS

The present invention relates to perfluoroelastomers having a very good combination of mechanical properties, compression set and at low temperature properties and to the process for preparation thereof.

It is well known that perfluoroalkylvinylethers are generally used as monomers for the copolymerization with tetrafluoroethylene (TFE) to obtain perfluoroelastomers which are used in the space-, oil-, petrochemical and semi-conductor industry. The introduction of perfluorovinylether high amounts in crosslinkable fluoroelastomers implies elasticity properties at low temperature of fluorinated rubbers.

The need was felt to have available perfluoroelastomers having improved properties at low temperatures in combination with good mechanical and compression set properties.

To solve said technical problem fluorovinylethers with various structural properties have been proposed in the prior art. However from the prior art the obtained perfluoroelastomers do not show the combination of the above properties.

U.S. Pat. No. 3,132,123 describes the preparation of perfluoroalkylvinylethers, of the respective homopolymers and copolymers with TFE. The homopolymers are obtained under extreme experimental conditions, by using polymerization pressures from 4,000 to 18,000 atm. The homopolymer of the perfluoromethylvinylether (MVE) is an elastomer: however its Tg is not sufficiently low. The general formula of the described vinylethers is the following:

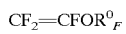

$CF_2=CFOR^o_F$ wherein $R^o_F$ is a perfluoroalkyl radical preferably from 1 to 5 carbon atoms.

U.S. Pat. No. 3,450,684 relates to vinylethers of formula:

$CF_2=CFO(CF_2CFX^oO)_nCF_2CF_2X^o$ wherein $X^o=F$, Cl, $CF_3$, H; n' can range from 1 to 20.

Homopolymers obtained by UV polymerization are also described. The exemplified copolymers are not characterized with their mechanical and elastomeric properties at low temperatures.

U.S. Pat. No. 3,817,960 relates to the preparation and polymerization of perfluorovinylethers of formula:

$CF_3O(CF_2O)_{n''}CF_2CF_2OCF=CF_2$ wherein n" can range from 1 to 5. Characterization data on the above properties are not described.

U.S. Pat. No. 4,487,903 relates to the fluoroelastomeric copolymer preparation wherein perfluorovinylethers of formula:

$CF_2=CF(OCF_2CFY^o)_n{}^oOX^2$ are used, wherein $n^o$ ranges from 1 to 4; $Y^o=F$, Cl, $CF_3$, H; $X^2$ can be $C_1$–$C_3$ perfluoroalkyl, $C_1$–$C_3$ ω-hydroperfluoroalkyl, $C_1$–$C_3$ ω-chloroperfluoroalkyl. The polymer has a fluorovinylether unit content ranging from 15 to 50% by moles. Said vinylethers give copolymers having at low temperatures properties superior to those of the above perfluorovinylethers of PVE (perfluoropropylvinylether) and MVE type. Also in this case data relating to the above properties of the cured elastomer are not indicated.

EP 130,052 describes the polymerization of the perfluorovinylpolyethers (PVPE) which leads to the obtainment of amorphous perfluoropolymers having a $T_g$ ranging from −15° to −100° C. The described polymers have $T_g$ values which reach −76° C.; the further $T_g$ decrease is obtained by using perfluoropolyethers as plasticizers. In the patent copolymers and terpolymers of TFE and MVE with vinylethers (PVPE) of formula:

$CF_2=CFO(CF_2CF(CF_3)O)_{n'''}R^o_f$ are described, wherein n''' ranges from 3 to 30 and $R^o_f$ is a perfluoroalkyl. Due to purification difficulties, the used vinylethers are mixtures of vinylethers with different values of n'''. According to this patent the most marked effect on the $T_g$ decrease is shown when n''' is equal to or higher than 3, preferably higher than 4.

U.S. Pat. No. 4,766,190 relates to the polymerization of perfluorovinylpolyethers (PVPE), similar to those described in U.S. Pat. No. 4,487,903, with TFE and low percentages of perfluoro propene, to increase the mechanical properties of the obtained polymers. No improvement of the mechanical and elastomeric properties at low temperatures is described.

U.S. Pat. No. 5,268,405 discloses the preparation of perfluorinated rubbers having a low Tg, by using perfluoropolyethers having a high viscosity as plasticizers of perfluorinated rubbers (TFE/MVE copolymers). The obtained manufactured articles have the drawback that during the use, exudations of the perfluoropolyethers (PFPE) take place, in particular when PFPE has low molecular weight (low viscosity): in the patent it is therefore disclosed the use of PFPE having high viscosity; those having low viscosity must be previously removed.

U.S. Pat. No. 5,401,818 relates to the perfluorovinylether preparation of formula:

$R^1_f(OCF_2CF_2CF_2)_{m'}$—$OCF=CF_2$ (wherein $R^1_f$ is a $C_1$–$C_3$ perfluoroalkyl radical; m' is an integer raanging from 1 to 4) and of the respective copolymers having improved properties at low temperature. The preparation of said perfluorovinylethers requires also a perfluorination with elementary $F_2$ which from the industrial point of view requires supplementary process unities.

Furthermore it is well known that by increasing the perfluorooxyalkylene units which are part of the side perfluorooxyalkylene substituent of perfluorooxyalkylvinylethers, the Tg of the obtained amporphous copolymers decreases. However it is not possible to obtain polymers with the optimal combination of the above properties.

The amorphous copolymers of TFE with perfluoromethylvinylether have $T_g$ of about 0° C. or a little lower (Maskornik, M. et al. "ECD-006 Fluoroelastomer—A high performance engineering material". Soc. Plast Eng. Tech. Pao. (1974), 20, 675–7). The extrapolated value of the MVE homopolymer $T_g$ is of about −5° C. (J. Macromol. Sci.-Phys., B1(4), 815–830, December 1967).

In patent application EP 1,148,072 fluorovinylethers allowing to lower the Tg of the respective copolymers are described, but the mechanical and elastomeric properties of the obtained manufactured articles are not described.

The perfluoroelastomers described in the prior art do not show the optimal combination of the above properties, in particular it would be desirable to have available perfluoroelastomers which when cured show the following combination of properties:

good mechanical and elastomeric properties, high resistance to low temperatures such as for example shown by TR 10 (ASTM D 1329 method), much lower Tg with respect to vinylethers having the same oxygen number and carbon atoms, maintenance of good mechanical and elastomeric properties even at high temperatures to have a high thermal range of the perfluoroelastomer use, higher productivity of perfluoroelastomer in Kg of polymer/(hour×liter of water).

The Applicant has surprisingly and unexpectedly found that it is possible to solve the above technical problem as described hereinafter.

An object of the present invention are perfluoroelastomers, curable by peroxidic route, obtainable by polymerizing the following monomers:

a) tetrafluoroethylene (TFE);

b) fluorovinylethers of general formula:

$$CFX=CXOCF_2OR \quad (I)$$

wherein

R has the following meanings:
  $C_2-C_6$ linear or branched (per)fluoroalkyl,
  $C_5-C_6$ cyclic (per)fluoroalkyl,
  $C_2-C_6$ linear or branched (per)fluoro oxyalkyl, containing from one to three oxygen atoms,
X=F, H;

c) bis-olefins having general formula:

$$R'_1R'_2C=CR'_3-Z-CR'_4=CR'_5R'_6 \quad (IA)$$

wherein $R'_1$, $R'_2$, $R'_3$, $R'_4$, $R'_5$, $R'_6$ equal to or different from each other, are H or $C_1-C_5$ alkyl;

Z is a $C_1-C_{18}$ linear or branched alkylene or $C_4-C_{18}$ cycloalkylene radical, optionally containing oxygen atoms, preferably at least partially fluorinated, or a (per)fluoropolyoxyalkylene radical;

d) optionally, one or more fluorinated olefinic comonomers selected from the following:
  $C_3-C_8$ perfluoroolefins, such hexafluoropropene (HFP), and/or chlorotrifluoroethylene (CTFE);
  perfluoroalkylvinylethers (PAVE) $CF_2=CFOR^2_f$ wherein $R^2_f$ is a $C_1-C_6$ perfluoroalkyl, for example trifluoromethyl, heptafluoropropyl;
  perfluoro-oxyalkylvinylethers $CF_2=CFOX^a$, wherein $X^a$ is a $C_1-C_{12}$ alkyl, or a $C_1-C_{12}$ oxyalkyl, or a $C_1-C_{12}$ (per)fluoro-oxyalkyl having one or more ether groups, for example perfluoro-2-propoxypropyl;

said perfluoroelastomers comprising halogen atoms selected from iodine and/or bromine in the chain and/or in end position, said iodine and/or bromine atoms deriving from "cure site" comonomers and/or from chain transfer agents used in polymerization.

The preferred fluorovinylethers component b) are those of general formula:

$$CFX=CXOCF_2OCF_2CF_2Y \quad (II)$$

wherein Y=F, $OCF_3$; X as above.

The perfluorovinylethers of formula:

$$CF_2=CFOCF_2OCF_2CF_3 \quad (MOVE\ 1)$$

$$CF_2=CFOCF_2OCF_2CF_2OCF_3 \quad (MOVE\ 2)$$

are the most preferred.

Preferably in the bis-olefin component c) of formula (IA) $R'_1$, $R'_2$, $R'_3$, $R'_4$, $R'_5$, $R'_6$ are hydrogen and Z is a $C_4-C_{12}$ perfluoroalkylene radical or a (per)fluoropolyoxyalkylene radical of formula:

$$-(Q)_p-CF_2O-(CF_2CF_2O)_{ma}(CF_2O)_{na}-CF_2-(Q)_p- \quad (IIA)$$

wherein:

Q is a $C_1-C_{10}$ alkylene or oxyalkylene radical, preferably selected from $-CH_2OCH_2-$; $-CH_2O(CH_2CH_2O)_sCH_2-$, s being=an integer from 1 to 3;

p is an integer and is zero or 1;

ma and na are numbers such that the ma/na ratio is from 0.2 to 5, the molecular weight of the (per)fluoropolyoxyalkylene radical of formula (IIA) being from 500 to 10,000, preferably from 1,000 to 4,000.

More preferably the bis-olefin has formula:

$$CH_2=CH-(CF_2)_{t0}-CH=CH_2$$

wherein t0 is an integer from 6 to 10 carbon atoms.

The iodine and/or bromine atoms in the chain and/or in end position of the polymer can be introduced by brominated and/or iodinated "cure site" comonomers, such for example the following:

$C_2-C_{10}$ bromo and/or iodo olefins, containing at least one atom, preferably from one to three bromine and/or iodine atoms, $C_1-C_{10}$ linear or branched (per)fluoroalkylvinylethers and/or (per)fluorooxyalkylvinylethers containing at least one iodine and/or bromine atom.

The iodine and/or bromine atom in the polymer end position can be introduced also using iodinated and/or brominated chain transfer agents, such as for example the following:

compounds of formula $R^b_f(I)_x(Br)_y$, wherein $R^b_f$ is a (per)fluoroalkyl or a (per)fluorochloroalkyl having from 1 to 8 carbon atoms, while x and y are integers comprised between 0 and 2, with $1 \leq x+y \leq 2$;

iodides and/or bromides of alkaline or alkaline-earth metals.

Preferably the perfluoroelastomer contains iodine atoms in the chain and/or in end position.

The preferred optional component d) is perfluoromethylvinylether (MVE) having formula $CF_2=CF-O-CF_3$.

As said, the perfluoropolymers of the invention show the combination of the above properties.

In particular the decrease of Tg obtained by using the vinylethers component b) is due to the presence of the $(-OC-F_2O)$ unit directly linked to the unsaturation. Besides it has been found that said unit increases the reactivity of the vinylether component b).

The advantages of the perfluoroelastomers of the invention can be summarized as follows:

improved mechanical and elastomeric properties;

very good reactivity of the fluorovinylethers component b), in Kg of polymer/(hour liter of water);

low Tg;

low TR 10.

The amount of fluorovinylethers component b) to obtain the perfluoroelastomers of the invention must be such to lead to the crystalline site disappearance so to obtain an amorphous copolymer.

Generally the amount of units deriving from the fluorovinylether component b) which allows to obtain amorphous polymers is preferably higher than 15% by moles, more preferably higher than 20% by moles. There are no limits to the maximum amount of b): molar amounts up to 80–90% can generally be used. If in the polymer, besides units deriving from the fluorovinylether component b), units deriving from the optional monomers component d) are present, the total molar amount of b)+d) must be higher than 15%, preferably higher than 20% by moles. The total amount of b)+d) can reach percentages of 80–90% by moles.

The amount of units in the chain deriving from the bis-olefin component c) is generally from 0.01 to 2.0% by moles, preferably from 0.05 to 0.8% by moles.

The amount of units deriving from brominated and/or iodinated "cure-site" comonomers in the final compound is from 0 to 5% by moles.

The iodine and/or bromine amount from transfer agent present in the chain end groups is from 0% to 2% by weight, preferably from 0.05% to 0.8% by weight.

The total amount of iodine and/or bromine present in the perfluorinated polymer is in the range 0.05%–4% by weight.

The perfluoroelastomers of the invention are TFE-based copolymers, wherein TFE is copolymerized with the fluorovinylethers component b) and with the bisolefin component c); wherein also one or more comonomers selected from component d) can optionally be present.

The preferred monomeric compositions (% by moles) are the following:

| TFE | 40–85 |
|---|---|
| component b) | 1–50, pref. 5–40 |
| component c) | 0.01–2 |
| iodine amount (in % by weight) | 0.05–0.6 |
| component d) | 0–50 | the sum of the molar percentages of component b)+component d) being such to give an amorphous polymer, said sum being higher than 15%, preferably higher than 20%, and the sum of the molar percentages of the monomers being equal to 100%.

The bis-olefins component c) of formula (IA) wherein Z is an alkylene or cycloalkylene radical can be prepared as for example described by I. L. Knunyants et al. in Izv. Akad. Nauk. SSR, Ser. Khim. 1964(2), 384–6, while the bis-olefins containing (per)fluoropolyoxyalkylene sequences are obtainable by following the reactions reported in U.S. Pat. No. 3,810,874.

The brominated and/or iodinated "cure-site" comonomers are for example described in U.S. Pat. Nos. 4,035,565 and 4,694,045, 4,745,165, 4,564,662 and EP 199,138.

For the iodinated and/or brominated chain transfer agents see for example U.S. Pat. Nos. 4,243,770 and 4,943,622.

For the chain transfer agents formed by iodides and/or bromides of alkaline or alkaline-earth metals see U.S. Pat. No. 5,173,553.

The preparation of perfluoroelastomers of the present invention is carried out by copolymerization of the monomers in aqueous emulsion in the presence of an emulsion, dispersion or microemulsion of perfluoropolyoxyalkylenes, according to U.S. Pat. Nos. 4,789,717 and 4,864,006. Preferably the synthesis is carried out in the presence of perfluoropolyoxyalkylene microemulsion.

According to well known methods of the prior art, radical initiators, for example, alkaline or ammonium persulphates, perphosphates, perborates or percarbonates, optionally in combination with ferrous, cupreous or silver salts, or of other easily oxidizable metals, are used. In the reaction medium also surfactants of various type are optionally present, among which the fluorinated surfactants of formula:

are particularly preferred, wherein $R^3_f$ is a $C_5$–$C_{16}$ (per) fluoroalkyl chain or a (per)fluoropolyoxyalkyl chain, $X^-$ is —COO$^-$ or —SO$_3^-$, $M^+$ is selected from: $H^+$, $NH_4^+$, an alkaline metal ion. Among the most commonly used we remember: ammonium perfluorooctanoate, (per) fluoropolyoxyalkylenes ended with one or more carboxyl groups, etc. See U.S. Pat. Nos. 4,990,283 and 4,864,006.

The polymerization reaction is generally carried out at temperatures in the range 25° C.–150° C., at a pressure comprised between the atmospheric one up to 10 MPa.

Alternatively or in combination with the chain transfer agents containing iodine and/or bromine, other chain transfer agents known in the prior art, as ethyl acetate, diethylmalonate, etc., can be used.

When the polymerization is over, the perfluoroelastomer is isolated from the emulsion by conventional methods, as the coagulation by addition of electrolytes or by cooling.

The perfluoroelastomers object of the present invention are cured by peroxidic route, according to known techniques, by addition of a suitable peroxide capable to generate radicals by heating.

Among the most commonly used peroxides the following are mentioned: dialkylperoxides, such for example, di-terbutyl-peroxide and 2,5-dimethyl-2,5-di (terbutylperoxy)hexane; di-cumyl peroxide, dibenzoyl peroxide; diterbutyl perbenzoate; di-[1,3-dimethyl-3-(terbutylperoxy)butyl]carbonate. Other peroxidic systems are described for example in European patent applications EP 136,596 and EP 410,351.

To the curing blend other compounds are then added, such as:

(A) curing coagents, in an amount generally in the range 0.5–10%, preferably 1–7%, by weight with respect to the polymer; among them those commonly used are: bis-olefins of formula (IA); triallyl-cyanurate, triallyl-isocyanurate (TAIC), tris(diallylamine)-s-triazine; triallylphosphite; N,N-diallyl-acrylamide; N,N,N',N'-tetraallyl-malonamide; tri-vinyl-isocyanurate; and 4,6-tri-vinyl-methyltrisiloxane, etc.: TAIC and the bis-olefin of formula:

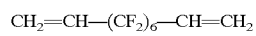

are particularly preferred;

(B) optionally a metal compound, in an amount in the range 0–15%, preferably 2–10%, by weight with respect to the polymer, selected from oxides and hydroxides of divalent metals, such for example Mg, Zn, Ca or Pb, optionally combined with a weak acid salt, such for example stearates, benzoates, carbonates, oxalates or phosphites of Ba, Na, K, Pb, Ca;

(C) optionally acid acceptors, in an amount from 0 to 10% by weight with respect to the polymer, of the non metal oxide type, such 1,8 bis dimethyl amino naphthalene, octadecylamine etc. as described in EP 708,797;

(D) optionally conventional additives, such thickeners, pigments, antioxidants, stabilizers and the like, the amount of each of said additives being between 0 and 10% by weight with respect to the polymer;

(E) optionally fillers in amounts from 0 to 80% by weight with respect to the polymer, preferably from 15 to 50% by weight, such for example carbon black, silica, barium sulphate, titanium dioxide, etc. Fillers of semi-crystalline fluoropolymers, such PTFE, MFA and PFA, can also be present.

The copolymers of the invention when cured by peroxidic route show a very good combination of properties, in particular they satisfy the following test: a copolymer having the following composition in per cent by moles:

| | |
|---|---|
| tetrafluoroethylene (TFE) | 69.9% |
| fluorovinylethers component b) MOVE 1 | 30% |
| bis-olefin component c) of formula $CH_2=CH-(CF_2)_6-CH=CH_2$ | 0.1% | having as attack site for the peroxidic crosslinking an iodine amount, in per cent by weight, equal to 0.24%, the iodine being present on the chain end groups through the iodinated transfer agent 1,4-diiodoperfluorobutane ($C_4F_8I_2$), in a compound containing for 100 phr of perfluoroelastomer:

| | |
|---|---|
| Luperco ® 101 XL* | 1.5 |
| DRIMIX ® TAIC** | 2 |
| ZnO | 5 |
| Black MT ®N990 | 20 |

*conaining 45% by weight of 2,5-dimethyl-2, 5-di(terbutylperoxy)hexane
**containing 75% by weight of TAIC cured in press for 10 minutes at 160° C., subjected to post-cure in an air forced circulation stove at 230° C. for 4 hours, after a warming step from room temperature to 230° C. lasting one hour, shows the following combination of properties:

| | |
|---|---|
| stress at break (ASTM D 412-83) | >13 MPa |
| elongation at break (ASTM D 412-83) | >130% |
| hardness (shore A) | >65 |
| compression set (ASTM D 395) on O-ring at 200° C. for 70 h | <40% |
| TR 10 (ASTM D 1329) | <−20° C. |

The synthesis process of the (per)fluorovinylethers component b) comprises the following steps:

a') initial reaction of the hypofluorite with a fluorinated olefin of formula $R_1R_2C=CR_3R_4$ to give the hypofluorite

b') reaction of the hypofluorite with a second fluorinated olefin of formula $R_5R_6C=CR_7R_8$ to give the intermediate

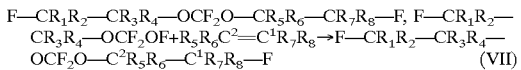

c') dehalogenation or dehydrohalogenation and obtainment of the perfluorovinylethers.

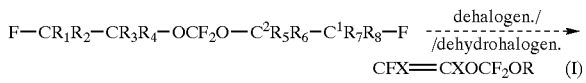

In said synthesis scheme:
  with reference to the formula of compound (VII):
    $R_1$, $R_4$, equal or different, are H, F; $R_2$, $R_3$, equal or different are H, Cl at the following conditions: (1) when the final reaction is a dehalogenation $R_2$, $R_3$=Cl, (2) when the final reaction is a dehydrohalogenation one of the two substituents $R_2$, $R_3$ is H and the other is Cl;

$R_5$, $R_6$, $R_7$, $R_8$ are:
    F, or one of them is a $C_1$–$C_4$ linear or branched perfluoroalkyl group, or a $C_1$–$C_4$ linear or branched perfluorooxyalkyl group containing from one to three oxygen atoms, or $R_5$ and $R_7$, or $R_6$ and $R_8$, are linked each other to form with $C^2$ and $C^1$ a $C_5$–$C_6$ perfluoroalkyl cycle;
    when one of the radicals $R_5$ to $R_8$ is a $C_2$–$C_4$ linear or branched fluoroalkyl, or a $C_2$–$C_4$ linear or branched fluorooxyalkyl containing from one to three oxygen atoms, one or two of the other $R_5$ to $R_8$ are F and one or two of the remainders, equal to or different from each other, are selected from H, Cl; when the substituents selected from H and Cl are two, they are both linked to the same carbon atom;
    when $R_5$ and $R_7$, or $R_6$ and $R_8$, are linked each other to form with $C^2$ and $C^1$ a $C_5$–$C_6$ fluoroalkyl cycle, one of the two free substituents $R_6$, $R_8$ or $R_5$, $R_7$ is F and the other is selected from H, Cl.

the fluoroalkene used in the reaction a') is replaceable with that of the subsequent reaction b'); in this case the meanings defined for the substituents of the $R_1$–$R_4$ group, and respectively of the $R_5$–$R_8$ group, are interchangeable each other, with the proviso that the position of each radical of each of the two groups $R_1$–$R_4$ and $R_5$–$R_8$ with respect to —$OCF_2O$— on the chain of the intermediate compound (VII), is the same which is occupied when the synthesis takes place according to the above scheme, and the two olefins react each in the planned steps.

In the first reaction a') of the above scheme a hypofluorite gas flow $CF_2(OF)_2$, suitably diluted with an inert fluid, comes into contact, in a suitable reactor equipped with outlet, on the bottom of the same (first reactor), with a flow formed by the olefin $R_1R_2C=CR_3R_4$, optionally diluted in an inert fluid, to allow the chemical reaction a') with formation of the intermediate hypofluorite (VI). To favour the reaction stoichiometry the reactants must be introduced into the reactor in an about unitary molar ratio, or with an excess of $CF_2(OF)_2$. The residence time of the mixture in the reactor can range from few hundredths of second up to about 120 seconds in in function of the olefin reactivity, the reaction temperature and the presence of optional reaction solvents.

The reaction temperature can range from −40° to −150° C., preferably from −80° to −130° C.

Compound (VI) is usually not separated from the reaction crude compound and is continuously transferred in the subsequent reaction described in step b').

The compound mixture coming out from the first reactor can be heated to room temperature before being fed to the second reactor.

In the second reaction b') the second olefin $R_5R_6C=CR_7R_8$ at the pure state or in solution, reacts with the compound obtained in the first reaction with formation of compound (VII).

The olefin can be continuously fed so as to maintain constant its concentration in the reactor. The temperature of the reaction b') can range from −20° to −130° C., preferably from −50° to −100° C. The olefin concentration is higher than or equal to 0.01M, preferably the concentration is higher than 3M, more preferably also the pure compound can be used.

The solvents used in steps a') and b') are perfluorinated or chlorohydrofluorinated solvents or hydrofluorocarbons. Examples of said solvents are: $CF_2Cl_2$, $CFCl_3$, $CF_3CF_2H$, $CF_3CFH_2$, $CF_3CF_2CF_3$, $CF_3CCl_2H$, $CF_3CF_2Cl$.

In the reaction c') compound (VII), depending on the olefins used in steps a') and b'), upon distillation from the reaction crude compound, is subjected to dechlorination or to dehydrochlorination to obtain the vinylethers of formula (I).

This last step can be carried out by using reactions widely described in the prior art. The suitable selection of the substituents from $R_1$ to $R_8$ in the two olefins used in the synthesis allows to obtain the vinylethers of the present invention.

The following Examples are reported with the purpose to illustrate the invention and they do not limit the scope thereof.

EXAMPLE 1

Copolymer TFE/MOVE 1 ($CF_2$=CF—O—$CF_2$—O—$CF_2CF_3$) 70/30% by Moles

In a 5 liter autoclave, equipped with stirrer working at 630 rpm, were introduced, after air evacuation, 3.5 liters of demineralized water and 34.5 ml of a microemulsion obtained by mixing:

7.5 ml of a perfluoropolyoxyalkylene having acid end group of formula:

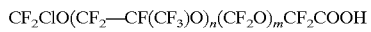

$CF_2ClO(CF_2-CF(CF_3)O)_n(CF_2O)_mCF_2COOH$ wherein n/m=10, having average molecular weight of 600;

7.5 ml of an aqueous solution of $NH_3$ at 30% by volume;

15 ml of demineralized water;

4.5 ml of Galden® D02 of formula:

$CF_3O(CF_2-CF(CF_3)O)_n(CF_2O)_mCF_3$ wherein n/m=20, having average molecular weight of 450.

The autoclave was then heated to the temperature of 80° C. and maintained at said temperature for the whole reaction. Then 146 g of $CF_2$=CF—O—$CF_2$—O—$CF_2CF_3$ (MOVE 1), 6.2 g of 1,4-diiodoperfluorobutane ($C_4F_8I_2$) were added.

The autoclave inside is then pressurized at 5 bar (0.5 MPa) with tetrafluoroethylene (TFE).

When said internal pressure value is reached, are introduced:

0.35 g of ammoniumpersulphate (APS) as initiator;

2.2 g (6.2 mmoles) of bis-olefin having formula $CH_2$=CH—$(CF_2)_6$—CH=$CH_2$;

the bis-olefin addition is carried out for a total of 20 portions, each of 0.11 g, starting from the beginning of the polymerization and for every 5% increase in the monomer conversion;

462 g of $CF_2$=CF—O—$CF_2$—O—$CF_2CF_3$ (MOVE 1); the compound addition is carried out for a total of 19 portions, each of 24.3 g, starting when the monomer conversion equal to 5% takes place and continuing at every 5% increase in the monomer conversion.

The pressure is maintained constant for the whole polymerization by feeding pure TFE.

After 220 minutes of reaction, corresponding to 100% of the monomer conversion, the autoclave is cooled and the latex discharged.

The so obtained latex is coagulated with an aluminum sulphate solution (6 g of $Al_2(SO_4)_3$ for each liter of latex) and dried at 90° C. in an air circulating oven for 16 hours. 910 g of polymer are obtained.

By $^{19}$F-NMR analysis of the polymer hot dissolved in $C_6F_6$, the molar percentage of MOVE 1 in the polymer, equal to 30%, is determined.

The $T_g$ determined by DSC is −25° C.

The intrinsic viscosity of the polymer in Galden® D80 is 36.7 ml/g. The percentage by weight of iodine in the polymer, measured by XRF, is 0.24% by weight. The Mooney viscosity (ML(1+10' @ 121° C.)) determined according to the ATSM D 1646 method is 27 MU.

The obtained polymer is mixed in an open roll mixer with the crosslinking additives in phr ratios as shown in Table 1. The crosslinking curve, the mechanical properties, the compression set and TR 10 are reported in Table 1.

EXAMPLE 2

Copolymer TFE/MOVE 1 59/41% by Moles

In a 5 liter autoclave, equipped with stirrer working at 630 rpm, 3.5 liters of demineralized water and 35 ml of the microemulsion of Example 1, were introduced after evacuation.

The reaction mixture was heated to the temperature of 80° C., which was maintained for the whole reaction. Then 222 g of $CF_2$=CF—O—$CF_2$—O—$CF_2CF_3$ (MOVE 1), 5.5 g of 1,4-diiodoperfluorobutane ($C_4F_8I_2$) were added.

The autoclave inside is then pressurized at 4 bar (0.4 MPa) with tetrafluoroethylene (TFE).

It is then introduced in the autoclave:

0.53 g of ammoniumpersulphate (APS) as initiator;

2.6 g (7.3 mmoles) of bis-olefin having formula $CH_2$=CH—$(CF_2)_6$—CH=$CH_2$;

the bis-olefin addition is carried out for a total of 20 portions, each of 0.13 g, starting from the beginning of the polymerization and for every 5% increase in the monomer conversion;

703 g of $CF_2$=CF—O—$CF_2$—O—$CF_2CF_3$ (MOVE 1); the compound addition is carried out for a total of 19 portions each of 24.3 g, starting when the monomer conversion equal to 5% takes place and continuing at every 5% increase in the monomer conversion.

The pressure is maintained constant for the whole polymerization by feeding pure TFE.

After 500 minutes of reaction, corresponding to 100% of the monomer conversion, the autoclave is cooled and the latex discharged.

The latex is coagulated and treated as described in Example 1 obtaining 1,200 g of polymer.

By $^{19}$F-NMR analysis of the polymer hot dissolved in $C_6F_6$, the molar percentage of MOVE 1 in the polymer, equal to 41%, is determined.

The $T_g$ determined by DSC is −31° C.

The intrinsic viscosity of the polymer in Galden® D80 is 35.8 ml/g. The percentage by weight of iodine in the polymer, measured by XRF, is 0.16% by weight.

The obtained polymer is mixed in an open roll mixer with the crosslinking additives in phr ratios as shown in Table 1. The crosslinking curve, the mechanical properties, compression set and TR 10 are reported in Table 1.

EXAMPLE 3

Terpolymer TFE/MOVE 1 78/22% by Moles

In a 2 liter autoclave, equipped with stirrer working at 800 rpm, were introduced after air evacuation, 1.3 1 of demineral-ized water and 20 ml of a microemulsion obtained by mixing:

4.3 ml of a perfluoropolyoxyalkylene having acid end group having the same formula and the same molecular weight as that used in the microemulsion of Example 1;

4.3 ml of an aqueous solution of $NH_3$ at 30% by volume;

8.8 ml of demineralized water;

2.6 ml of Galden® D02 (formula and molecular weight in Example 1).

The autoclave inside was heated to the temperature of 80° C. and maintained at said temperature for the whole reaction. Then 33 g of $CF_2=CF-O-CF_2-O-CF_2CF_3$ (MOVE 1) and 1.1 g of 1,4-diiodoperfluorobutane ($C_4F_8I_2$) were added in the autoclave.

The autoclave inside is then pressurized at 6 bar (0.6 MPa) with tetrafluoroethylene (TFE).

It is then introduced in the autoclave:

0.065 g of ammoniumpersulphate (APS) as initiator;

0.4 g (1.1 mmoles) of bis-olefin having formula $CH_2=CH-(CF_2)_6-CH=CH_2$;

the compound addition was carried out for a total of 20 portions, each of 0.02 g, starting from the beginning of the polymerization and for every 5% increase in the monomer conversion;

5.8 g of 4-bromo-heptafluoroethylvinylether $CF_2=CF-O-CF_2CF_2Br$; the compound addition was carried out for a total of 20 portions, each of 0.29 g, starting from the beginning of the polymerization and for every 5% increase in the monomer conversion;

104.5 g of $CF_2=CF-O-CF_2-O-CF_2CF_3$ (MOVE 1); the compound addition is carried out for a total of 19 portions, each of 5.5 g, starting when the monomer conversion equal to 5% takes place and continuing at every 5% increase in the monomer conversion.

The pressure of 6 bar (0.6 MPa) is maintained constant for the whole polymerization by feeding pure tetrafluoroethylene (TFE).

After 240 minutes of reaction, corresponding to 100% of the monomer conversion, the autoclave is cooled and the latex discharged.

The latex is coagulated and treated as described in Example 1 obtaining 200 g of polymer.

By $^{19}$F-NMR analysis of the polymer hot dissolved in $C_6F_6$, the molar percentage of MOVE 1 in the polymer, equal to 22%, is determined.

The $T_g$ determined by DSC is −23° C.

The intrinsic viscosity of the polymer in Fluorinert® FC-75 is 28.4 ml/g. The percentage by weight of iodine and bromine in the polymer, measured by XRF, are respectively 0.16% and 0.47% by weight. The Mooney viscosity (ML (1+10' @ 121° C.)) determined according to the ATSM D 1646 method is 48 MU.

The obtained polymer is mixed in a roll open mixer with the crosslinking additives in phr ratios as shown in Table 1. The crosslinking curve, the mechanical properties, the compression set and TR 10 are reported in Table 1.

EXAMPLE 4

Comparative

Copolymer TFE/MOVE 1 76/24

In a 40 ml AISI-316 reactor for polymerization, equipped with magnetic stirring, pressure transducer and inlet for the feeding and discharge of the reactants, 250 µl of perfluoropropionylperoxide at 3% by weight of $CFCl_2CF_2Cl$, 9.8 mmoles of MOVE 1 and 18 mmoles of tetrafluoroethylene are introduced.

The reactor is cooled to the temperature of −196° C., evacuated, then brought again to room temperature and cooled again, the whole twice.

At the end of the degassing operations, the reactor is thermostated at the temperature of 30° C. and the reaction mixture maintained under magnetic stirring. The internal pressure decreases from 6.4 atm to 4.7 atm in about 8 hours (reaction time).

After distillation of the unreacted monomers and polymer stripping under vacuum for 3 hours at 150° C., 1,100 mg of polymer are recovered, which appears as a transparent and colourless rubber.

By $^{19}$F-NMR analysis of the polymer hot dissolved in $C_6F_6$ it is determined that the molar percentage of MOVE 1 in the polymer is 24%.

The $T_g$, determined by DSC, is −21° C. The intrinsic viscosity of the polymer measured at 30° C. in Fluorinert® FC-75, is of 35.5 ml/g.

EXAMPLE 5

Comparative

Copolymer TFE/β-PDE ($CF_3OCF_2CF_2OCF=CF_2$) 77/23

In a reactor for polymerizations equal to that described in Example 4, 250 µl of perfluoropropionylperoxide at 3% by weight in $CFCl_2-CF_2Cl$, 10 mmoles of β-PDE and 18 mmoles of tetrafluoroethylene are in sequence introduced.

The procedure described in the previous Example 4 is followed till the thermostating step at the temperature of 30° C. under magnetic stirring.

By $^{19}$F-NMR analysis carried out on the polymer, it is determined that the molar percentage of β-PDE in the polymer is 23%. The $T_g$ determined by DSC is −5° C.

Said Tg value is evidently higher than that obtained in the TFE/MOVE 1 copolymer of Example 4 which contains a substantially identical molar percentage of vinylether.

TABLE 1

| EXAMPLES | | 1 | 2 | 3 |
|---|---|---|---|---|
| Formulation: | | | | |
| Luperco 101 XL | phr | 1.5 | 2 | 2 |
| Drimix TAIC | " | 2 | 4 | 3 |
| ZnO | " | 5 | 5 | 5 |
| Black MT N990 | " | 20 | 30 | 20 |
| Iodine | % by weight | 0.24 | 0.16 | 0.16 |
| Bromine | % by weight | 0 | 0 | 0.47 |
| Mooney polymer | $ML_{121° (1+10)}$ | 27 | — | 48 |
| Mooney blend | $ML_{121° (1+10)}$ | 24 | 59 | 22 |
| MDR arc 0.5°, 160° C., 12' (ASTM D 6204-97) | | | | |
| ML | Lbf.in. | 0.22 | 0.45 | 0.15 |
| MH | " | 12.4 | 10.3 | 14.2 |
| t'2 | min | 0.50 | 0.45 | 0.49 |
| ts2 | " | 0.63 | 0.64 | 0.64 |
| t'50 | " | 0.86 | 0.97 | 1.60 |
| t'90 | " | 1.81 | 2.35 | 11.4 |
| Vmax | Lbf.in./min | 20.0 | 11.8 | 12.2 |
| Mechanical properties after post-cure at 230° C. for 1 + 4 h (ASTM D 412-83) | | | | |
| M100 | Mpa | 5.3 | 5.2 | 8.9 |
| Stress at break | " | 13.5 | 8.0 | 13.4 |
| Elong. at break | % | 181 | 173 | 144 |
| Hardness Shore A | | 69 | 72 | 73 |
| Compression set 200° C. for 70 h | | | | |
| O-ring (ASTM D 395) | % | 32 | 48 | 50 |
| TR 10 (ASTM D 1329) | ° C. | −21 | −26 | −17 |

What is claimed is:

1. Perfluoroelastomers, curable by peroxidic route, obtained by polymerizing the following monomers:

a) tetrafluoroethylene (TFE);
b) fluorovinylethers of general formula:

$$CFX=CXOCF_2OR \qquad (I)$$

wherein
R has the following meanings:
$C_2$–$C_6$ linear or branched (per) fluoroalkyl,
$C_5$–$C_6$ cyclic (per) fluoroalkyl,
$C_2$–$C_6$ linear or branched (per) fluoro oxyalkyl, containing from one to three oxygen atoms,
X=F, H;
c) bis-olefins having general formula:

$$R'_1R'_2C=CR'_3-Z-CR'_4=CR'_5R'_6 \qquad (IA)$$

wherein
$R'_1$, $R'_2$, $R'_3$, $R'_4$, $R'_5$, $R'_6$, equal to or different from each other, are H or $C_1$–$C_5$ alkyl;
Z is a $C_1$–$C_{18}$ linear or branched alkylene or $C_4$–$C_{18}$ cycloalkylene radical, optionally containing oxygen atoms, or a (per) fluoropolyoxyalkylene radical;
d) optionally, one or more fluorinated olefinic comonomers selected from the following:
$C_3$–$C_8$ perfluoroolefins;
perfluoroalkylvinylethers (PAVE) $CF_2=CFOR^2_f$, wherein $R^2_f$ is a $C_1$–$C_6$ perfluoroalkyl;
perfluoro-oxyalkylvinylethers $CF_2=CFOX^a$, wherein $X^a$ is a $C_1$–$C_{12}$ alkyl, or a $C_1$–$C_{12}$ oxyalkyl, or a $C_1$–$C_{12}$ (per) fluorooxyalkyl having one or more ether groups;
said perfluoroelastomers comprising iodine and/or bromine atoms in the chain and/or in end position, said iodine and/or bromine atoms deriving from "cure site" comonomers and/or from chain transfer agents used in polymerization.

2. Perfluoroelastomers according to claim 1, wherein the fluorovinylethers component b) have general formula:

$$CFX=CXOCF_2OCF_2CF_2Y \qquad (II)$$

wherein Y=F, $OCF_3$; X as above.

3. Perfluoroelastomers according to claim 2, wherein the perfluorovinylethers have the following formulas:

$$CF_2=CFOCF_2OCF_2CF_3 \qquad (MOVE\ 1)$$

$$CF_2=CFOCF_2OCF_2CF_2OCF_3 \qquad (MOVE\ 2).$$

4. Perfluoroelastomers according to claim 1, wherein in formula (IA) of the bis-olefin component c) $R'_1$, $R'_2$, $R'_3$, $R'_4$, $R'_5$, $R'_6$ are hydrogen and Z is a $C_4$–$C_{12}$ perfluoroalkylene radical or a (per) fluoropolyoxyalkylene radical of formula:

$$-(Q)_p-CF_2O-(CF_2CF_2O)_{ma}(CF_2O)_{na}-CF_2-(Q)_p- \qquad (IIA)$$

wherein:
Q is a $C_1$–$C_{10}$ alkylene or oxyalkylene radical;
p is an integer and is zero or 1;
ma and na are numbers such that the ma/na ratio is from 0.2 to 5, the molecular weight of the (per) fluoropolyoxyalkylene radical of formula (IIA) being from 500 to 10,000.

5. Perfluoroelastomers according to claim 4, wherein the bis-olefin has formula:

$$CH_2=CH-(CF_2)_{t0}-CH=CH_2$$

wherein t0 is an integer from 6 to 10.

6. Perfluoroelastomers according to claim 1, wherein the brominated and/or iodinated "cure site" comonomers are selected from the following:

$C_2$–$C_{10}$ bromo and/or iodo olefins, containing at least one bromine and/or iodine atoms,
$C_1$–$C_{10}$ linear or branched (per) fluoroalkylvinylethers and/or (per) fluorooxyalkylvinylethers containing at least one iodine and/or bromine atom.

7. Perfluoroelastomers according to claim 1, wherein iodine and/or brominated chain transfer agents are selected from the following:

compounds of formula $R^b_f(I)_x(Br)_y$, wherein $R^b_f$ is a (per) fluoroalkyl or a (per) fluorochloroalkyl having from 1 to 8 carbon atoms, while x and y are 0, 1 or 2, with $1 \leq x+y \leq 2$;

iodides and/or bromides of alkaline or alkaline-earth metals.

8. Perfluoroelastomers according to claim 6, containing iodine atoms in the chain and/or in end position.

9. Perfluoroelastomers according to claim 1, wherein the optional component d) is perfluoromethylvinylether (MVE) $CF_2=CF-O-CF_3$.

10. Perfluoroelastomers according to claim 1, wherein the amount of units deriving from the fluorovinylether component b) is higher than 15% by moles.

11. Perfluoroelastomers according to claim 1, wherein the total amount of units deriving from the fluorovinylether component b) and from the optional monomers component d) is higher than 15%.

12. Perfluoroelastomers according to claim 1, wherein the amount of units in the chain deriving from the bis-olefin component c) is from 0.01 to 2.0% by moles.

13. Perfluoroelastomers according to claim 1, wherein the amount of units deriving from brominated and/or iodinated "cure-site" comonomers is from 0 to 5% by moles, the iodine and/or bromine amount from transfer agent present in the chain end groups is from 0% to 2% by weight.

14. Perfluoroelastomers according to claim 13, wherein the total amount of iodine and/or bromine present in the polymer is in the range 0.05%–4% by weight.

15. Perfluoroelastomers according to claim 1, having the following monomeric composition, in % by moles:

| | |
|---|---|
| TFE | 40–85 |
| component b) | 1–50, pref. 5–40 |
| component c) | 0.01–2 |
| iodine amount (in % by weight) | 0.05–0.6 |
| component d) | 0–50 | the sum of the molar percentages of component b)+component d) being higher than 15%, and the sum of the molar percentages of the monomers being equal to 100%.

16. Blends curable by peroxidic route containing the perfluoroelastomers according to claim 1, and (A) curing coagents, in an amount generally in the range 0.5–10% by weight with respect to the polymer;

(B) optionally a metal compound, in an amount in the range 0–15%, selected from oxides and hydroxides of divalent metals selected from Mg, Zn, Ca or Pb, optionally combined with a weak acid salt selected from stearates, benzoates, carbonates, oxalates or phosphites of Ba, Na, K, Pb, Ca;

(C) optionally acid acceptors, in an amount from 0 to 10% by weight with respect to the polymer, of the non metal oxide type;

(D) optionally additives selected from thickeners, pigments, antioxidants, and stabilizers, the amount of each of said additives being between 0 and 10% by weight with respect to the polymer;

(E) optionally fillers in amounts from 0 to 80% by weight with respect to the polymer selected from carbon black, silica, barium sulphate, titanium dioxide semicrystalline fluoropolymers.

17. Perfluoroelastomers according to claim 1, cured by peroxidic route.

18. Manufactured articles obtained from the perfluoroelastomers of claim 17.

19. The perfluoroelastomers of claim 4, wherein Q is —$CH_2OCH_2$— or —$CH_2O(CH_2CH_2O)_sCH_2$—, and wherein s is an integer from 1 to 3.

* * * * *